W. O. GOTCHALL.
TRACTION ENGINE TENDER.
APPLICATION FILED MAR. 15, 1918.

1,284,316.

Patented Nov. 12, 1918.

WITNESSES

INVENTOR
William O. Gotchall
BY Victor J. Evans
ATTORNEY

UNITED STATES PATENT OFFICE.

WILLIAM O. GOTCHALL, OF LEBANON, NEBRASKA.

TRACTION-ENGINE TENDER.

1,284,316.

Specification of Letters Patent.

Patented Nov. 12, 1918.

Application filed March 15, 1918. Serial No. 222,685.

*To all whom it may concern:*

Be it known that I, WILLIAM O. GOTCHALL, a citizen of the United States residing at Lebanon, in the county of Redwillow and State of Nebraska, have invented new and useful Improvements in Traction-Engine Tenders, of which the following is a specification.

This invention relates to vehicles, and more especially to draft appliances; and the object of the same is to produce a tender or trailer intended especially to follow a traction engine and to contain water and coal or other fuel so that the engineer will not have to proceed frequently throughout the day to a point where he can replenish his stock of the supply.

Another and important object is to provide this trailer or tender with draft appliances at its rear end by means of which a plow or other machine may be coupled thereto and will trail accurately behind the tender although the latter is preferably provided with short turning gears between its axles.

Details will be found in the following specification, and reference is made to the drawings herein and in which.

Figure 1:
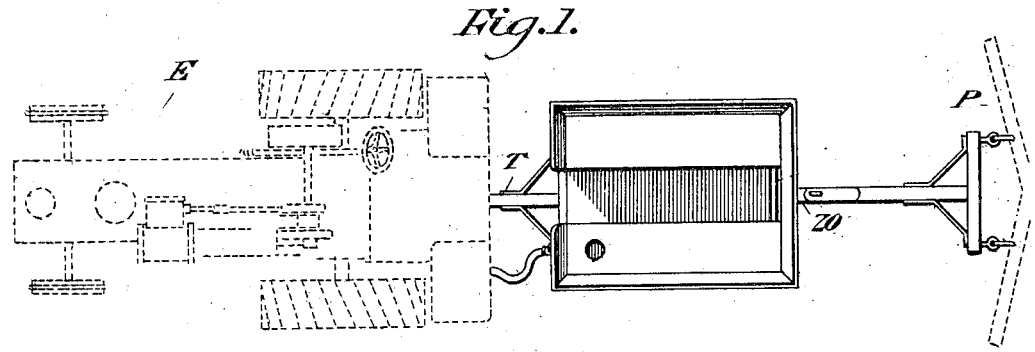
Figure 1 is a plan view on rather a small scale, showing the traction engine in front and the plow in the rear in dotted lines, and the draft appliances by means of which this tender is connected with such elements.
Figure 2:
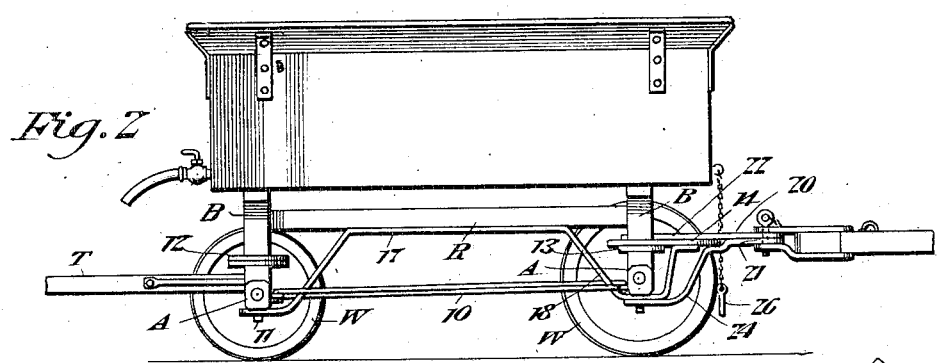
Fig. 2 is a side elevation of the tender with its near wheels removed.
Figure 3:
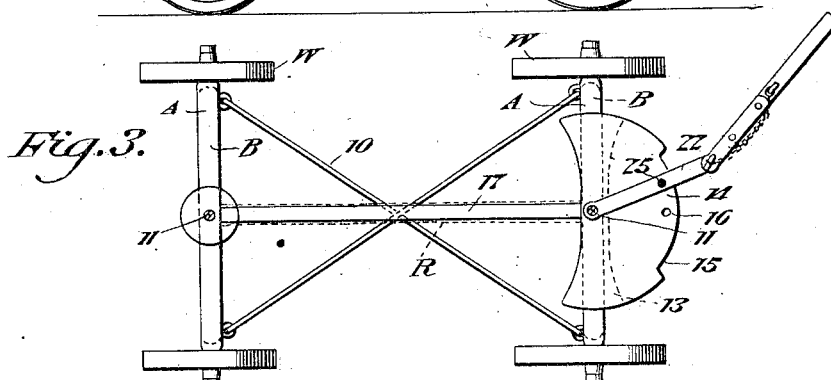
Fig. 3 is a plan view of the running gear of the tender with the bolsters and reach in dotted lines, the tongue removed, and the draft bar at the rear turned to one side.

The traction engine is broadly designated by the letter E, and the plow or other implement to be drawn by this tender is broadly designated by the letter P. The axles A of the tender have wheels W journaled at their extremities as usual, and a tongue T connects the front axle with the engine. A reach R rigidly connects two bolsters B which support the body of the tender, and no novelty is claimed for the parts thus far described.

By preference the two axles are connected by short turning gear, herein shown as crossed rods 10, so that they will turn on their king-bolts 11 oppositely and simultaneously as well understood. Surrounding the forward bolt and disposed between the forward axle and bolster, is a fifth wheel 12 of any approved type, consisting merely of two washers although this is not essential. Overlying and secured upon the rearward axle is the lower member of another fifth wheel, which member consists of a plate 13 a little wider than the axle and considerably longer than it is wide and through whose center passes the rearward king-bolt. Secured below the rear bolster above this plate is the other member of said rear fifth wheel, which consists of an upper plate 14 substantially semi-circular on its rear edge as shown, cut away as at 15 at its edge, and provided with a hole 16 at its center mounted on the king-bolt. A brace 17 of strap iron is secured at its center along the lower face of the reach with its forward end bent downward and receiving the lower end of the front king-bolt, and its rearward end arched downward as at 18 and receiving the lower end of the rear king-bolt, while its rearmost upturned extremity is secured beneath said upper member of the rear fifth wheel for sustaining and bracing the same.

Figure 4:
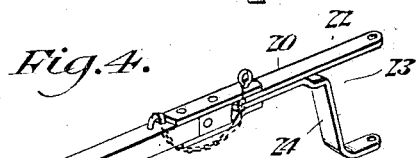
Fig. 4 is an enlarged perspective detail of said draft-bar and its associated parts.

The draft-bar or coupling member by means of which a plow or other trailer P can be connected with this tender, is best seen in detail in Fig. 4. This consists of a yoke whose stem 20 is perforated as at 21 for attachment to the trailer P, whose upper fork arm 22 passes over the upper plate of the fifth wheel and is pivotally mounted on the rear king-bolt, and whose lower fork arm 23 passes beneath the curved edge of said upper member where it is cut away, then turns downward as at 24 and is shaped to pass around the arch of the strap brace, and finally has its lower end mounted pivotally on the lower extremity of the rear king-bolt; and the two fork arms are pierced with alined openings 25 through which may be passed a pin 26 which passes intermediately through the hole 16 in the upper plate to lock the draft yoke when it is not desired that it shall swing from side to side. When the pin is removed, obviously the draft-bar or yoke may swing, although the degree of its lateral movement is limited by the ends of the cut-away portion in the curved edge of the upper plate, and therefore it may never swing aside to such an extent as to come in contact with the rear wheels. Thus is provided an extremely powerful draft mechanism by means of which the resistance set up by the plow or some other trailer as it is drawn through the earth is conveyed through the running gear and tongue to the tractor and yet has the least possible effect on the tender and the running gear thereof, while permitting its wheels to turn on the short turning gear mechanism as suggested. The strain on the rear king-bolt is conveyed to the forward king-bolt both through the reach and the strap brace, the former connecting the upper ends of the two king-bolts and the latter their lower ends, and the fork arms of the draft bar or draft yoke are connected at two points with the rear king-bolt so as to divide the strain thereon—yet there is no interference with the turning of the rear axle if the short turning gear should be employed as I prefer. The parts are of the desired materials and proportions, and changes in details may be made without departing from the principle of the invention.

What I claim as new is:—

1. In a tractor tender having bolsters and axles pivoted thereto by king bolts, the combination with short turning gear connecting the axles, a fifth wheel structure for the rear axle including a substantially semi-circular plate secured beneath its bolster and having a cut out in its rear curved edge, and a strap brace secured beneath this plate and downward under this axle; of a draft yoke whose stem has means for connection with a trailer and whose fork embraces said plate where cut out and the arch of the brace, its arms being pivoted on the king bolt.

2. In a tractor tender having bolsters connected by a reach and axles pivoted to the bolsters by king bolts, the combination with short turning gear connecting the axles, a fifth wheel structure for the rear axle including a substantially semi-circular plate secured beneath its bolster, and a strap brace secured beneath the plate and reach and arched downward under this axle; of a draft yoke whose stem has means for connection with a trailer and whose fork embraces said plate and the arch of the brace and has its arms pivoted on the king bolt, and a pin for removable insertion through holes in said arms and plate to lock the yoke against swinging movement when desired.

In testimony whereof I affix my signature.

WILLIAM O. GOTCHALL.